United States Patent
Generale et al.

(10) Patent No.: US 11,261,749 B2
(45) Date of Patent: Mar. 1, 2022

(54) COMPONENTS FOR GAS TURBINE ENGINES

(71) Applicant: Raytheon Technologies Corporation, Farmington, CT (US)

(72) Inventors: Adam P. Generale, Atlanta, GA (US); Dominic J. Mongillo, Jr., West Hartford, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 6 days.

(21) Appl. No.: 16/868,781

(22) Filed: May 7, 2020

(65) Prior Publication Data
US 2021/0054754 A1    Feb. 25, 2021

Related U.S. Application Data

(60) Provisional application No. 62/890,726, filed on Aug. 23, 2019.

(51) Int. Cl.
*F01D 9/06* (2006.01)
*F01D 5/18* (2006.01)

(52) U.S. Cl.
CPC ............. *F01D 9/065* (2013.01); *F01D 5/189* (2013.01); *F05D 2240/12* (2013.01); *F05D 2260/213* (2013.01)

(58) Field of Classification Search
CPC ...... F01D 5/189; F01D 9/065; F05D 2240/12; F05D 2240/127; F05D 2250/183;
(Continued)

(56) References Cited

U.S. PATENT DOCUMENTS 5,516,260 A * 5/1996 Damlis .................. F01D 5/189 415/115
7,497,655 B1 * 3/2009 Liang ..................... F01D 5/189 415/1
(Continued)

FOREIGN PATENT DOCUMENTS

EP      2716868 A2    4/2014
WO   2017171763 A1  10/2017

OTHER PUBLICATIONS

European Search Report for European Application No. 20190138.6, International Filing Date Aug. 7, 2020, dated Jan. 13, 2021, 8 pages.

*Primary Examiner* — Igor Kershteyn
(74) *Attorney, Agent, or Firm* — Cantor Colburn LLP

(57) ABSTRACT

Airfoil assemblies for gas turbine engines are described. The airfoil assemblies include an airfoil body having a leading edge, a trailing edge, a pressure side, and a suction side, the airfoil body extending in a radial direction between a first end and a second end, wherein the airfoil defines an internal cavity bounded by interior surfaces of the airfoil body, the airfoil body formed from a high-temperature-material material and a metallic insert member installed within the internal cavity. One or more radially extending ribs are arranged on an exterior surface of the metallic insert member and defining one or more radially extending passages between the exterior surface of the metallic insert member and the interior surface of the airfoil body.

20 Claims, 10 Drawing Sheets

(58) Field of Classification Search
CPC ......... F05D 2250/184; F05D 2260/213; F05D 2260/2212; F05D 2260/22141; F05D 2300/13; F05D 2300/6033
See application file for complete search history.

(56) References Cited

U.S. PATENT DOCUMENTS

| | | |
|---|---|---|
| 7,625,180 B1 | 12/2009 | Liang |
| 9,988,913 B2 | 6/2018 | Spangler |
| 10,006,295 B2 | 6/2018 | Spangeler et al. |
| 10,215,028 B2 | 2/2019 | Schetzel et al. |
| 2006/0120869 A1* | 6/2006 | Wilson ............ F01D 5/147 416/97 R |
| 2011/0123351 A1* | 5/2011 | Hada ............ F01D 5/189 416/97 R |
| 2014/0093392 A1* | 4/2014 | Tibbott ............ F01D 5/188 416/97 R |
| 2016/0222796 A1 | 8/2016 | Spangler et al. |
| 2017/0268358 A1 | 9/2017 | Lee et al. |
| 2017/0356296 A1 | 12/2017 | Tibbott et al. |
| 2018/0328188 A1* | 11/2018 | Marinelli ............ F01D 5/186 |
| 2019/0093487 A1* | 3/2019 | Marsh ............ F01D 5/189 |
| 2020/0263557 A1 | 8/2020 | Whittle et al. |

* cited by examiner

COMPONENTS FOR GAS TURBINE ENGINES

CROSS REFERENCE TO RELATED APPLICATIONS

This application claims the benefit of an earlier filing date from U.S. Provisional Application Ser. No. 62/890,726, filed Aug. 23, 2019, the entire disclosure of which is incorporated herein by reference.

BACKGROUND

Illustrative embodiments pertain to the art of turbomachinery, and specifically to turbine rotor components.

Gas turbine engines are rotary-type combustion turbine engines built around a power core made up of a compressor, combustor and turbine, arranged in flow series with an upstream inlet and downstream exhaust. The compressor compresses air from the inlet, which is mixed with fuel in the combustor and ignited to generate hot combustion gas. The turbine extracts energy from the expanding combustion gas, and drives the compressor via a common shaft. Energy is delivered in the form of rotational energy in the shaft, reactive thrust from the exhaust, or both.

The compressor and turbine sections are typically subdivided into a number of stages, which are formed of alternating rows of rotor blade and stator vane airfoils. The airfoils are shaped to turn, accelerate and compress the working fluid flow, or to generate lift for conversion to rotational energy in the turbine.

Airfoils may incorporate various cooling cavities located adjacent external side walls. Such cooling cavities are subject to both hot material walls (exterior or external) and cold material walls (interior or internal). Although such cavities are designed for cooling portions of airfoil bodies, various cooling flow characteristics can cause hot sections where cooling may not be sufficient. Accordingly, improved means for providing cooling within an airfoil may be desirable.

BRIEF DESCRIPTION

According to some embodiments, airfoil assemblies for gas turbine engines are provided. The airfoil assemblies include an airfoil body having a leading edge, a trailing edge, a pressure side, and a suction side, the airfoil body extending in a radial direction between a first end and a second end, wherein the airfoil defines an internal cavity bounded by interior surfaces of the airfoil body, the airfoil body formed from a high-temperature-material material and a metallic insert member installed within the internal cavity. One or more radially extending ribs are arranged on an exterior surface of the metallic insert member and defining one or more radially extending passages between the exterior surface of the metallic insert member and the interior surface of the airfoil body.

In addition to one or more of the features described above, or as an alternative, further embodiments of the airfoil assemblies may include that at least one of the one or more radially extending ribs extends a full height from the exterior surface of the metallic insert member to the interior surface of the airfoil body and contacts the interior surface of the airfoil body.

In addition to one or more of the features described above, or as an alternative, further embodiments of the airfoil assemblies may include one or more heat transfer augmentations features on the exterior surface of the metallic insert member and arranged within one of the one or more radially extending passages.

In addition to one or more of the features described above, or as an alternative, further embodiments of the airfoil assemblies may include that the one or more heat transfer augmentations features are arranged in at least one of a single arrangement and a double arrangement along the exterior surface of the metallic insert member within one of the one or more radially extending passages.

In addition to one or more of the features described above, or as an alternative, further embodiments of the airfoil assemblies may include one or more feed slots at an end of the metallic insert member and arranged to allow a flow of air from an interior of the metallic insert member into the one or more radially extending passages.

In addition to one or more of the features described above, or as an alternative, further embodiments of the airfoil assemblies may include a platform, wherein the airfoil body extends from the platform.

In addition to one or more of the features described above, or as an alternative, further embodiments of the airfoil assemblies may include that the internal cavity of the airfoil body is a mid-body cavity defined within the airfoil body.

In addition to one or more of the features described above, or as an alternative, further embodiments of the airfoil assemblies may include that the airfoil body defines a plurality of additional internal cavities including at least a leading edge cavity and a trailing edge cavity.

In addition to one or more of the features described above, or as an alternative, further embodiments of the airfoil assemblies may include that the one or more radially extending ribs includes at least one full-length radially extending rib and at least one partial-length radially extending rib.

In addition to one or more of the features described above, or as an alternative, further embodiments of the airfoil assemblies may include that the high-temperature-material material of the airfoil body is a ceramic matrix composite.

In addition to one or more of the features described above, or as an alternative, further embodiments of the airfoil assemblies may include that the high-temperature-material material of the airfoil body is a refractory metal alloy.

In addition to one or more of the features described above, or as an alternative, further embodiments of the airfoil assemblies may include that the one or more radially extending ribs are at least one of non-linear and non-uniform in the radial direction.

In addition to one or more of the features described above, or as an alternative, further embodiments of the airfoil assemblies may include that one or more heat transfer augmentation features are arranged in an array of discrete non-continuous features along the exterior surface of the metallic insert member within at least one or more radially extending passages.

In addition to one or more of the features described above, or as an alternative, further embodiments of the airfoil assemblies may include that the one or more radially extending ribs may be curvilinear, include multiple inflections, or be formed of oscillating curves of constant or varying radii.

In addition to one or more of the features described above, or as an alternative, further embodiments of the airfoil assemblies may include that the one or more radially extending ribs may be discontinuous and/or segmented in at least one radial location along the exterior surface of the metallic insert member.

According to some embodiments, gas turbine engines are provided. The gas turbine engines include an airfoil assembly having an airfoil body having a leading edge, a trailing edge, a pressure side, and a suction side, the airfoil body extending in a radial direction between a first end and a second end, wherein the airfoil defines an internal cavity bounded by interior surfaces of the airfoil body, the airfoil body formed from a high-temperature-material material and a metallic insert member installed within the internal cavity. One or more radially extending ribs are arranged on an exterior surface of the metallic insert member and defining one or more radially extending passages between the exterior surface of the metallic insert member and the interior surface of the airfoil body.

In addition to one or more of the features described above, or as an alternative, further embodiments of the gas turbine engines may include that at least one of the one or more radially extending ribs extends a full height from the exterior surface of the metallic insert member to the interior surface of the airfoil body and contacts the interior surface of the airfoil body.

In addition to one or more of the features described above, or as an alternative, further embodiments of the gas turbine engines may include one or more heat transfer augmentations features on the exterior surface of the metallic insert member and arranged within one of the one or more radially extending passages.

In addition to one or more of the features described above, or as an alternative, further embodiments of the gas turbine engines may include one or more feed slots at an end of the metallic insert member and arranged to allow a flow of air from an interior of the metallic insert member into the one or more radially extending passages.

In addition to one or more of the features described above, or as an alternative, further embodiments of the gas turbine engines may include a platform, wherein the airfoil body extends from the platform.

In addition to one or more of the features described above, or as an alternative, further embodiments of the gas turbine engines may include that the one or more radially extending ribs includes at least one full-length radially extending rib and at least one partial-length radially extending rib.

In addition to one or more of the features described above, or as an alternative, further embodiments of the gas turbine engines may include that the high-temperature-material material of the airfoil body is one of a ceramic matrix composite and a refractory metal alloy.

In addition to one or more of the features described above, or as an alternative, further embodiments of the gas turbine engines may include that the one or more radially extending ribs are at least one of non-linear and non-uniform in the radial direction.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be illustrative and explanatory in nature and non-limiting.

BRIEF DESCRIPTION OF THE DRAWINGS

The following descriptions should not be considered limiting in any way. With reference to the accompanying drawings, like elements are numbered alike: The subject matter is particularly pointed out and distinctly claimed at the conclusion of the specification. The foregoing and other features, and advantages of the present disclosure are apparent from the following detailed description taken in conjunction with the accompanying drawings in which like elements may be numbered alike and:

DETAILED DESCRIPTION

Detailed descriptions of one or more embodiments of the disclosed apparatus and/or methods are presented herein by way of exemplification and not limitation with reference to the Figures.

Figure 1:
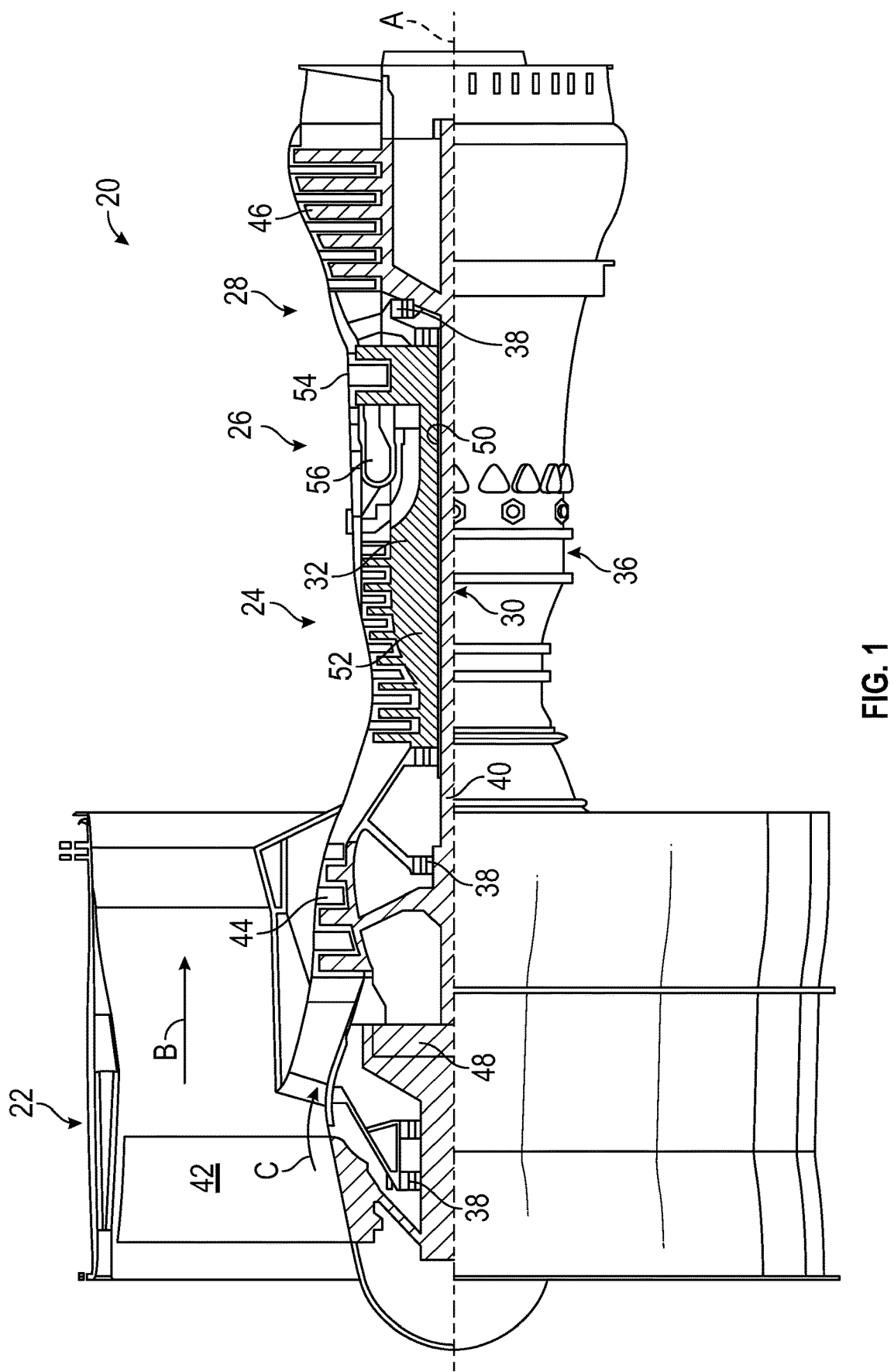
FIG. 1 is a schematic cross-sectional illustration of a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. An engine static structure 36 is arranged generally between the high pressure turbine 54 and the low pressure turbine 46. The engine static structure 36 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one non-limiting example is a high-bypass geared aircraft engine. In a further non-limiting example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present disclosure is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,688 meters). The flight condition of 0.8 Mach and 35,000 ft (10,688 meters), with the engine at its best fuel consumption—also known as "bucket cruise Thrust Specific Fuel Consumption (' TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °\ R)/(514.7°\ R)]^{0.5}$. The "Low corrected fan tip speed" as disclosed herein according to one non-limiting embodiment is less than about 1150 ft/second (350.5 m/sec).

Although the gas turbine engine 20 is depicted as a turbofan, it should be understood that the concepts described herein are not limited to use with the described configuration, as the teachings may be applied to other types of engines such as, but not limited to, turbojets, turboshafts, etc.

Figure 2:
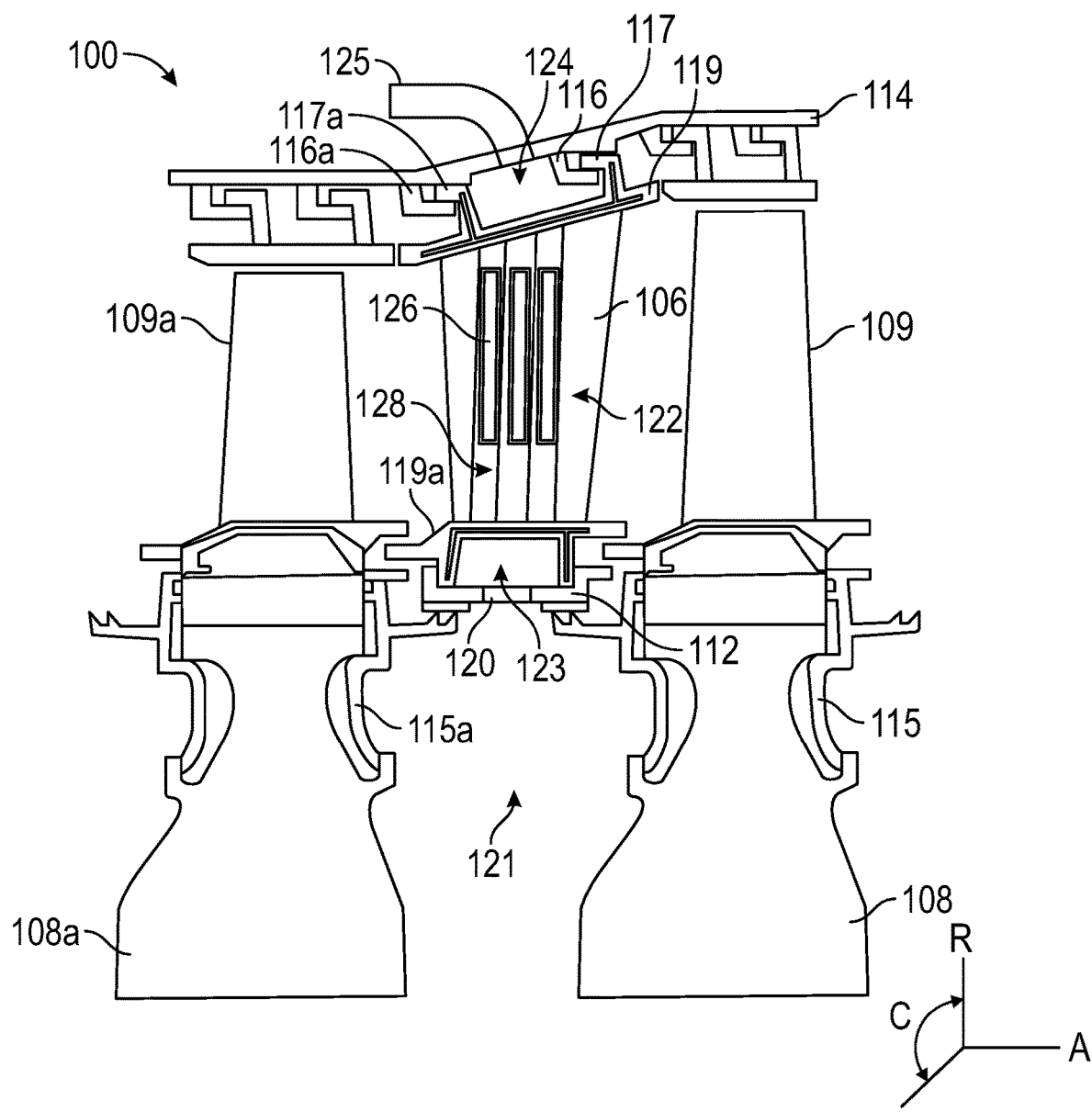
FIG. 2 is a schematic illustration of a portion of a turbine section of the gas turbine engine of FIG. 1.

Referring now to FIG. 2, a cooling design in a turbine section 28 for a gas turbine engine 20 may utilize a vane 106 disposed between axially adjacent bladed full hoop disks 108, 108a having respective blades 109, 109a. As shown, vane 106 is disposed radially between an inner air seal 112 and a full hoop case 114 on an outer side. Inner air seal 112 may be a full hoop structure supported by opposing vanes, including a plurality of vanes 106 that are separated in a circumferential direction. Vane 106 is supported by the full hoop case 114 through segmented vane hooks 117, 117a. One or more full hoop cover plates 115, 115a may minimize leakage between the vane 106 and the blades 109, 109a. The vane 106 is radially supported by the full hoop case 114 with segmented case hooks 116, 116a in mechanical connection with the segmented vane hooks 117, 117a. The vane 106 may be circumferentially supported between circumferentially adjacent platforms 119, 119a which may include feather seals that can minimize leakage between the adjacent vanes 106 into the gas path.

Although FIG. 2 depicts a second stage vane, as appreciated by those of skill in the art, embodiments provided herein can be applicable to first stage vanes as well. Such first stage vanes may have cooling flow supplied to the vane at both the inner and outer diameters, as opposed to the through-flow style cavity which goes from, for example, outer diameter to inner diameter. Thus, the present illustrations are not to be limiting but are rather provided for illustrative and explanatory purposes only.

In the present illustration, a turbine cooling air (TCA) conduit 125 provides cooling air into an outer diameter vane cavity 124 defined in part by an outer platform 119 and the full hoop case 114. The vane 106 is hollow so that air can travel radially into and longitudinally downstream from the outer diameter vane cavity 124, through the vane 106 via one or more vane cavities 122, and into a vane inner diameter cavity 123. The vane inner diameter cavity 123 is defined, in part, by an inner platform 119a. Thereafter air may travel through an orifice 120 in the inner air seal 112 and into a rotor cavity 121. Accordingly, cooling air for at least portions of the vane 106 will flow from a platform region, into the vane, and then out of the vane and into another platform region and/or into a hot gaspath/main gaspath. In some arrangements, the vane 106 and/or the platforms 119, 119a may include ejection holes to enable some or all of the air to be injected into the main gaspath.

It is to be appreciated that the longitudinal orientation of vane 106 is illustrated in a radial direction, but other orientations for vane 106 are within the scope of the disclosure. In such alternate vane orientations, fluid such as cooling air can flow into the vane cavity 122 through an upstream opening illustrated herein as outer diameter cavity 124 and out through a downstream opening in vane cavity 122 illustrated herein as inner diameter cavity 123. A longitudinal span of vane cavity 122 being between such openings.

The vane 106, as shown, includes one or more baffles 126 located within the vane 106. The baffles 126 are positioned within one or more respective baffle cavities 128. The baffle cavities 128 are sub-portions or sub-cavities of the vane cavity 122. In some embodiments, such as shown in FIG. 2, the baffle cavities 128 are internal cavities that are axially inward from the leading and trailing edges of the vane 106, although such arrangement is not to be limiting. The TCA conduit 125 may provide cooling air that can flow into the baffles 126 and then impinge from the respective baffle 126 onto an interior surface of the vane 106.

As shown and labeled in FIG. 2, a radial direction R is upward on the page (e.g., radial with respect to an engine axis) and an axial direction A is to the right on the page (e.g., along an engine axis). Thus, radial cooling flows will travel up or down on the page and axial flows will travel left-to-right (or vice versa). A circumferential direction C is a direction into and out of the page about the engine axis.

Figure 3A:
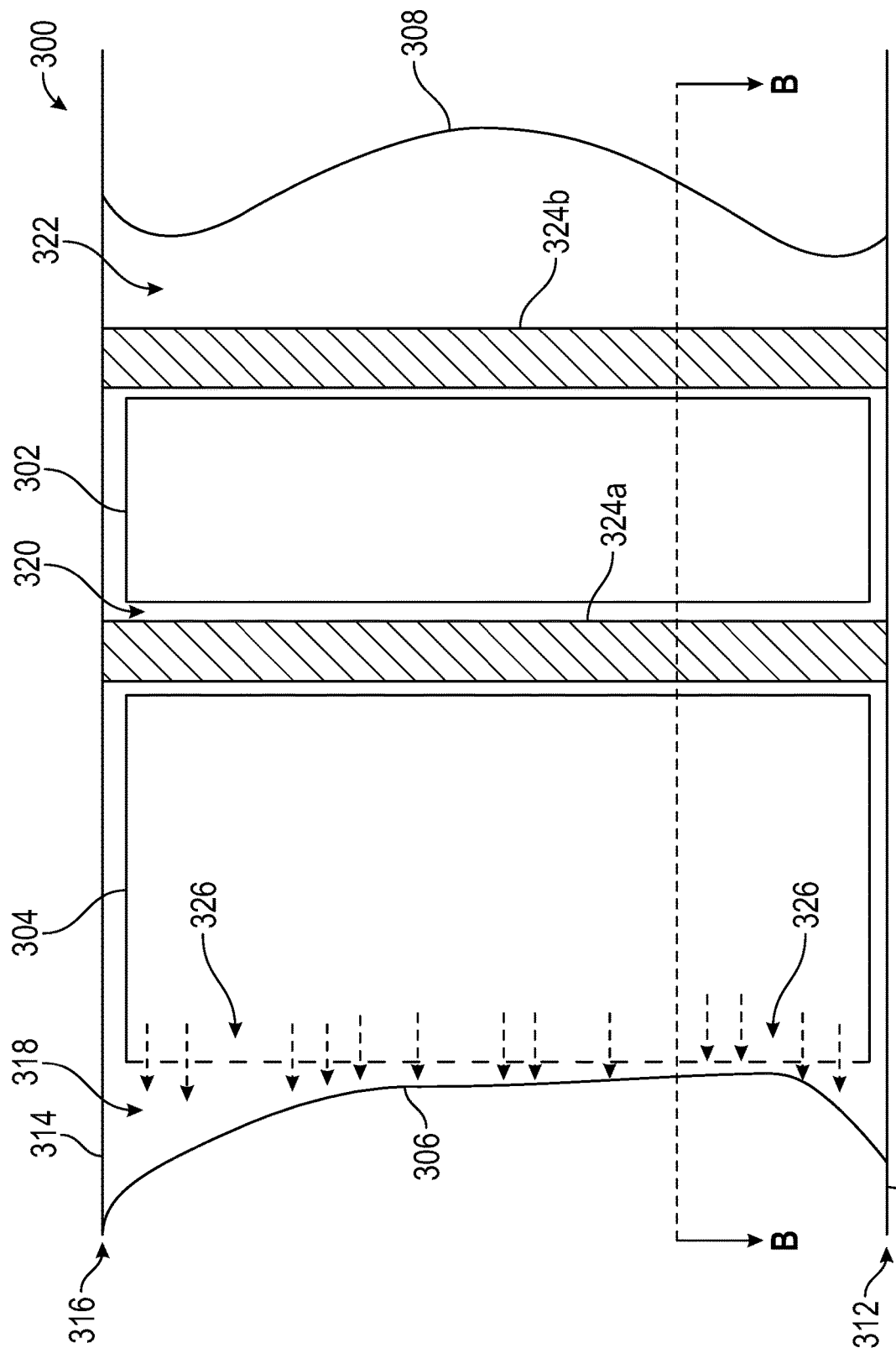
FIG. 3A is an axial cross-section schematic illustration of an airfoil.
Figure 3B:
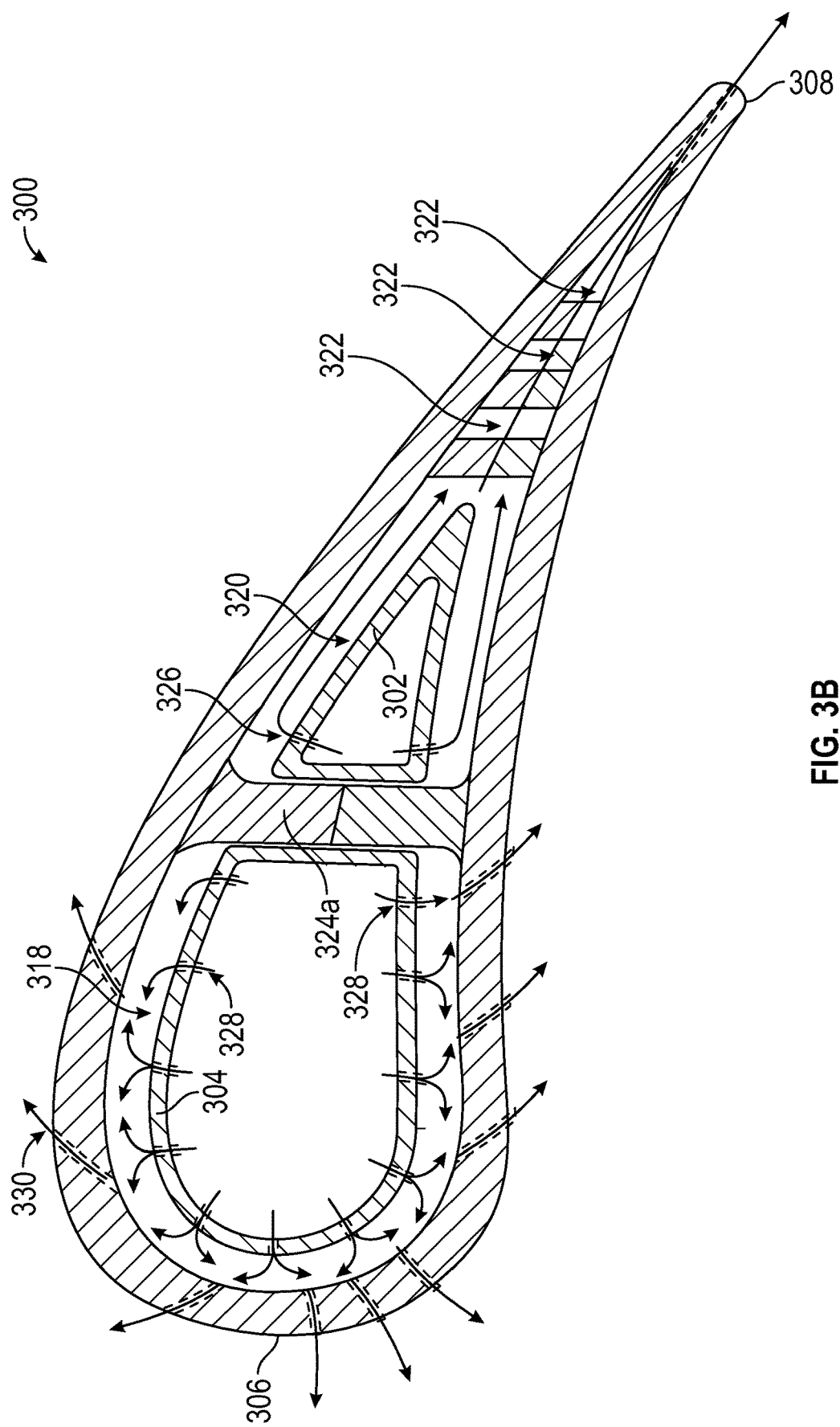
FIG. 3B is a cross-sectional illustration of the airfoil of FIG. 3A as viewed along the line B-B of FIG. 3A.

Turning now to FIGS. 3A-3B, schematic illustrations of an airfoil 300 having a first baffle 302 and a second baffle 304 installed therein are shown. Each baffle 302, 304 has a baffle body that defines the structure and shape of the respective baffle 302, 304. The airfoil 300 extends in an axial direction between a leading edge 306 and a trailing edge 308. In a radial direction, the airfoil 300 extends between an inner platform 310 at an inner diameter 312 and an outer platform 314 at an outer diameter 316. In this illustrative embodiment, the airfoil 300 has three internal cavities: a leading edge cavity 318, a mid-cavity 320, and a trailing edge cavity 322. Although shown with a specific cavity configuration, those of skill in the art will appreciate that airfoils can have a variety of internal cavity configurations and implement embodiment of the present disclosure. Thus, the present illustration is merely for explanatory purposes and is not to be limiting. FIG. 3A is an axial cross-section illustration of the airfoil 300 illustrating an internal structure thereof. FIG. 3B is a cross-sectional illustration as viewed along the line B-B. It will be appreciated by those of ordinary skill in the art that a typical metallic airfoil (e.g., Ni-base airfoil) will include trip strips cast into the interior wall surfaces of internal cavities and/or the inserted baffles include impingement holes for enabling impinging air to cool the interior surfaces of the airfoil.

One or more of the cavities 318, 320, 322 may be separated by rib 324 with fluid connections therebetween in some embodiments. The rib 324 extends radially between the inner platform 310 at the inner diameter 312 to the outer platform 314 at the outer diameter 316. A first rib 324 may separate the mid-cavity 320 from the leading edge cavity 318, and may, in some embodiments, fluidly separate the two cavities 318, 320. A second rib may separate the mid-cavity 320 from the trailing edge cavity 322, and may, in some embodiments, have through holes to fluidly connect the mid-cavity 320 to the trailing edge cavity 322. In some embodiments, the cavities 318, 320, 322 may include one or more heat transfer augmentation features, such as trip strips, pedestals, pin fins, etc. included in the airfoil body (i.e., cast in) and/or attached to the interior wall surfaces.

In this embodiment, the leading edge cavity 318 includes a second baffle 304 installed therein and the mid-cavity 320 includes a first baffle 302 therein. The first baffle 302 includes first baffle apertures 326 (shown in FIG. 3B) to supply cooling air from within the first baffle 302 into the mid-cavity 320. The cooling air within the mid-cavity 320 may flow into the trailing edge cavity 322 and subsequently exit the airfoil 300 through a discharge slot of the trailing edge 308. Such discharge slot of the trailing edge 308 may include various internal cooling features to provide an appropriate air flow distribution in order to provide adequate thermal cooling effectiveness in order to achieve local metal temperature, durability life, and aerodynamic performance characteristics. The second baffle 304 includes second baffle apertures 328 where cooling air within the second baffle 304 may impinge upon surfaces of the airfoil 300 of the leading edge cavity 318. The cooling or impinged air may then exit the leading edge cavity 318 through film cooling apertures 330, as will be appreciated by those of skill in the art.

In some airfoils, the leading edge may not include a baffle, but rather may include a leading edge feed cavity and a leading edge impingement cavity, wherein flow from the leading edge feed cavity will flow through impingement apertures to impinge upon an airfoil leading edge hot wall, and then exit the leading edge impingement cavity through an array of film cooling apertures. Aft of the leading edge cavity arrangement may be one or more additional cavities, which typically includes a trailing edge cavity. In such airfoil cooling configuration arrangements, the leading edge is typically supplied cooling air from a high pressure feed source emanating from the high compressor discharge air. The trailing edge, in contrast, may be fed from a lower pressure mid-compressor bleed source.

In addition to the above considerations, turbine airfoils may be required to endure high inlet temperatures with reductions in dedicated cooling flow due to associated cycle penalties. One way of accomplishing this is through the use of higher temperature capable materials such as ceramic matrix composites (CMCs) which can operate hundreds of degrees in excess of Ni-base super-alloys. However, due to the manufacturing process of CMCs, whether they are created by unidirectional tapes or woven fabrics, heat transfer augmentation features such as trip strips or pedestals cannot readily be created on surfaces of the CMC structures. Without the process capability to manufacture such internal cooling geometric features commonly fabricated from conventional core die and investment casting manufacturing methods, turbine components made from CMC materials are left to rely upon augmentation methodologies without fabrication features on the internal (e.g., hot) wall surfaces. Alternatively, enhanced backside convective heat transfer may be achieved by incorporating internal metallic insert members (e.g., metallic spars or baffles) comprising of various convective cooling heat transfer features. In some configurations, rib-like features may be employed and incorporated to segregate and/or distribute cooling air flow in an optimal manner to achieve a desired local and bulk thermal cooling effectiveness requirement that may be necessary to meet airfoil, as well as, inner diameter and outer diameter end-wall platform durability capability and life objectives.

While CMCs allow for an increase in operating temperatures over Ni-base superalloys, such components come with a severe reduction in load carrying ability. For the construction of CMC vanes, one method of overcoming this is to place a metallic insert member (e.g., metallic spar or baffle) through the vane to carry any mechanical load, while the CMC will absorb the thermal loading from the hot gas path. In placing this metallic insert member through the center of a CMC component due to other constraints, long passages may be formed without the ability to adequately cool the CMC with traditional methodologies such as direct impingement. Impingement cooling holes would require constant purging to maintain their jet effectiveness, which for long passages would come in the form of cooling holes through the CMC, increasing the flow requirement for the part. The placement of jet impingement holes through the structural spar may also reduce the stiffness of the spar itself, thus reducing its effectiveness while giving rise to local stress concentrations. The end goal of allotted cooling flow reduction for CMC components also forces departures from traditional internal cooling circuit design.

Traditionally, components with leading edge baffle inserts will incorporate impingement cooling through the baffle, followed by at least one or more film cooling hole rows and/or film hole arrays to serve as conduits for the cooling air to be discharged through the exterior airfoil wall. Such cooling configuration can be used to provide a fluidic insulating boundary layer of film to reduce the heat flux along the exterior airfoil surface during engine operation. The film cooling hole apertures in the hot exterior airfoil wall provide a method of purging the cooling air flow, in essence pulling the cooling air flow out of the cavity formed between the internal baffle insert and the internal surface of the exterior airfoil wall. The purging of the cooling air flow enables the flow apertures within the baffle to maintain a discrete jetting effect of impinging cooling flow along the interior surface of the exterior airfoil wall, thereby providing effective backside convective heat transfer and thermal cooling. However, with reductions in cooling air flow, multiple rows of film cooling apertures would not be feasible and therefore an impinging flow cooling method would not provide an appropriate level of internal convective heat transfer and thermal cooling effectiveness necessary to achieve airfoil component durability requirements.

Although specifically described above with respect to CMCs, other airfoil constructions may be possible for high temperature applications (i.e., higher than typical metallic cast airfoils). Other types of high temperature materials can include refractory metal alloys, CMCs, monolithic ceramic materials, etc. Some such refractory metal alloys may include, Niobium, Molybdenum, Tantalum, Tungsten, and Rhenium. As such, the term "high-temperature-material" material or airfoil refers to an airfoil constructed from CMCs, monolithic ceramic, or a refractory metal alloy material. "High temperature" as used herein, refers to operating temperatures within an engine that are 200° F.-300° F. below the incipient melting temperature of the metal alloy material used to form the airfoil body. For example, it will be appreciated that in the context of operation in gas turbine engines, "high temperature" for airfoils may refer to 2200° F. or greater. Such high temperature operation refers to operating temperatures that are greater than typically used with traditional metal cast airfoils or Ni-based superalloys. Such high-temperature-material materials may be less ductile (brittle) but advantageously offer higher operating temperature capability enabling reduced cooling air flow requirements.

In view of the above, embodiments of the present disclosure are directed to the incorporation of radially extending ribs and the inclusion of trip strips and/or alternative convective heat transfer cooling features onto the surface of a metallic insert member (e.g., metallic spar/baffle) in close proximity to the hot wall of the high-temperature-material airfoil body in order to increase turbulence and flow vorticities along the interior surface of the hot wall where heat transfer augmentation features cannot be applied due to the constraints associated with the fabrication of such high-temperature-material materials. As used herein a "hot wall" of an airfoil is an exterior wall or surface of the airfoil that is exposed to hot gaspath air during operation of a gas turbine engine. Radial channel flow area in the radial streamwise direction may be constant, converging, and/or diverging in area and may be controlled by variable rib heights on the metallic insert member. By placing the internal turbulence generating features on the metallic insert member, traditional manufacturing methodologies can be leveraged to improve the cooling technology used in conjunction with high temperature materials such as airfoils as well as outer and inner diameter end walls fabricated from high-temperature-material alloys and composite materials.

Further, in accordance with embodiments described herein, cooling configurations are provided that allow for flow reduction in passages bounded by ribs and enables elimination of the inclusion of purging cooling holes to enable other cooling configurations such as direct impingement. The aspect ratio of channels or passages formed between the metallic insert member and a high-temperature-material airfoil hot wall can be tailored to specific heat transfer requirements through adjustment in a radial flow area, through the placement of radial ribs, and/or the merging of various radial ribs, in addition to other mechanisms. For example, a height of the ribs in the streamwise or radial direction may be varied monotonically to control and tailor the cooling passage height formed between the exterior surface of the metallic insert member (e.g., metallic spar/baffle) and the interior surface of the hot exterior airfoil wall.

By incorporating the metallic insert member into the cooling concept of a high-temperature-material airfoil, embodiments described herein enable the creation of highly constricted skin core cooling passages. Such constricted skin core cooling passages have aspect ratios of the cooling passages defined as the ratio of the cooling passage height, formed between an exterior surface of the metallic insert member and an internal surface of the hot exterior airfoil wall, relative to a larger axial dimension (i.e., width) formed between the radially extending ribs protruding from the exterior surface of the metallic insert member. Tailoring the streamwise aspect ratio and flow area of the skin core cooling passages created between the metallic insert member and the internal surface of the exterior airfoil wall enables optimized cooling to be achieved. For example, various properties that may be tailored include local optimization of the internal cooling air velocity, Reynolds number, pressure loss, cooling air heat pickup, local and bulk internal convective heat transfer, and convective efficiency characteristics. Such optimization and tailoring may enable managing the variation in external heat flux, gas temperature, and external airfoil through-wall temperature gradients and absolute temperature. In some non-limiting examples, aspect ratios in accordance with some embodiments of the present disclosure may be between 0.1 to 0.8 or greater.

Figure 4A:
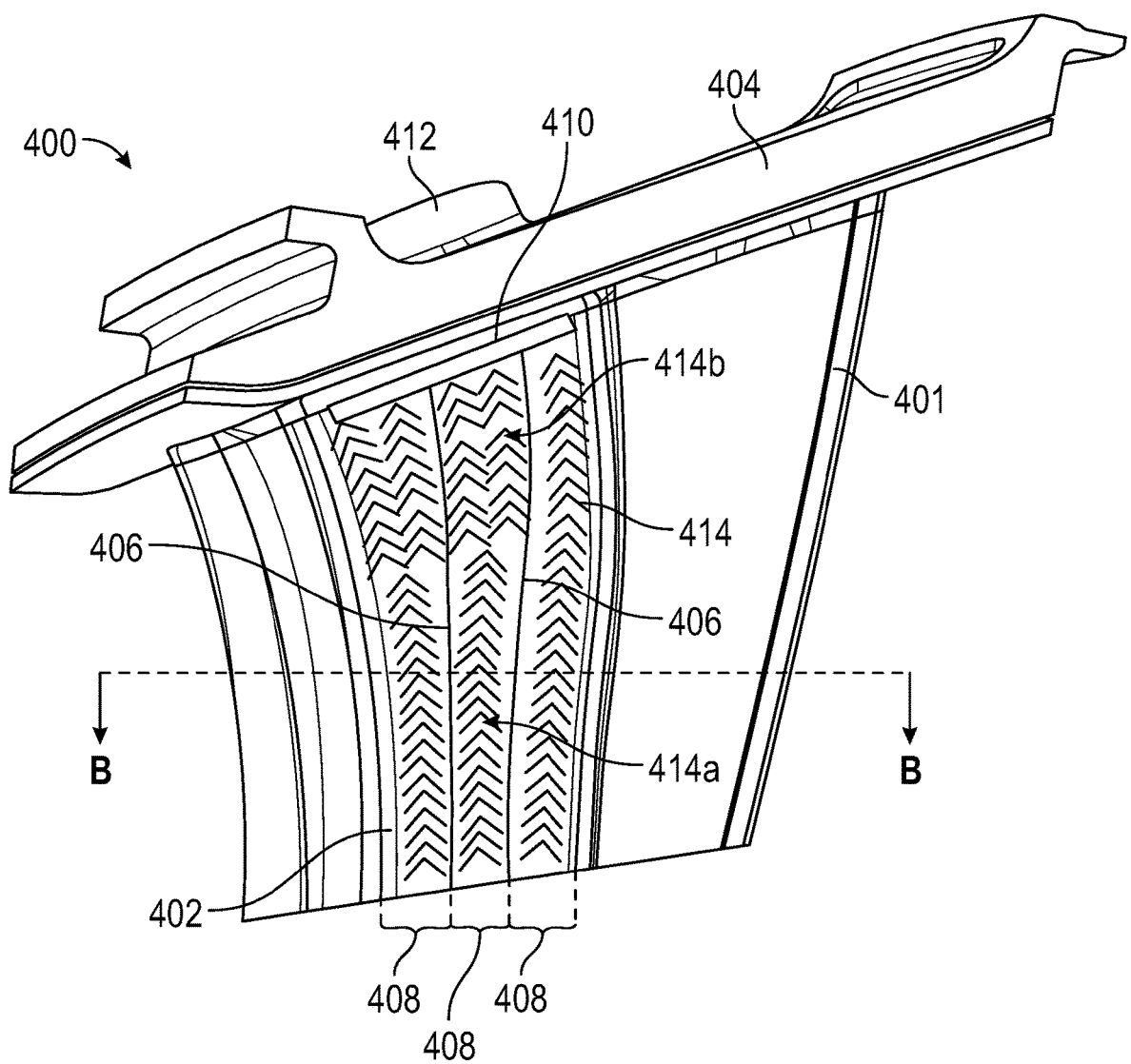
FIG. 4A is a schematic illustration of an airfoil assembly having an airfoil body and a metallic insert member in accordance with an embodiment of the present disclosure.
Figure 4B:
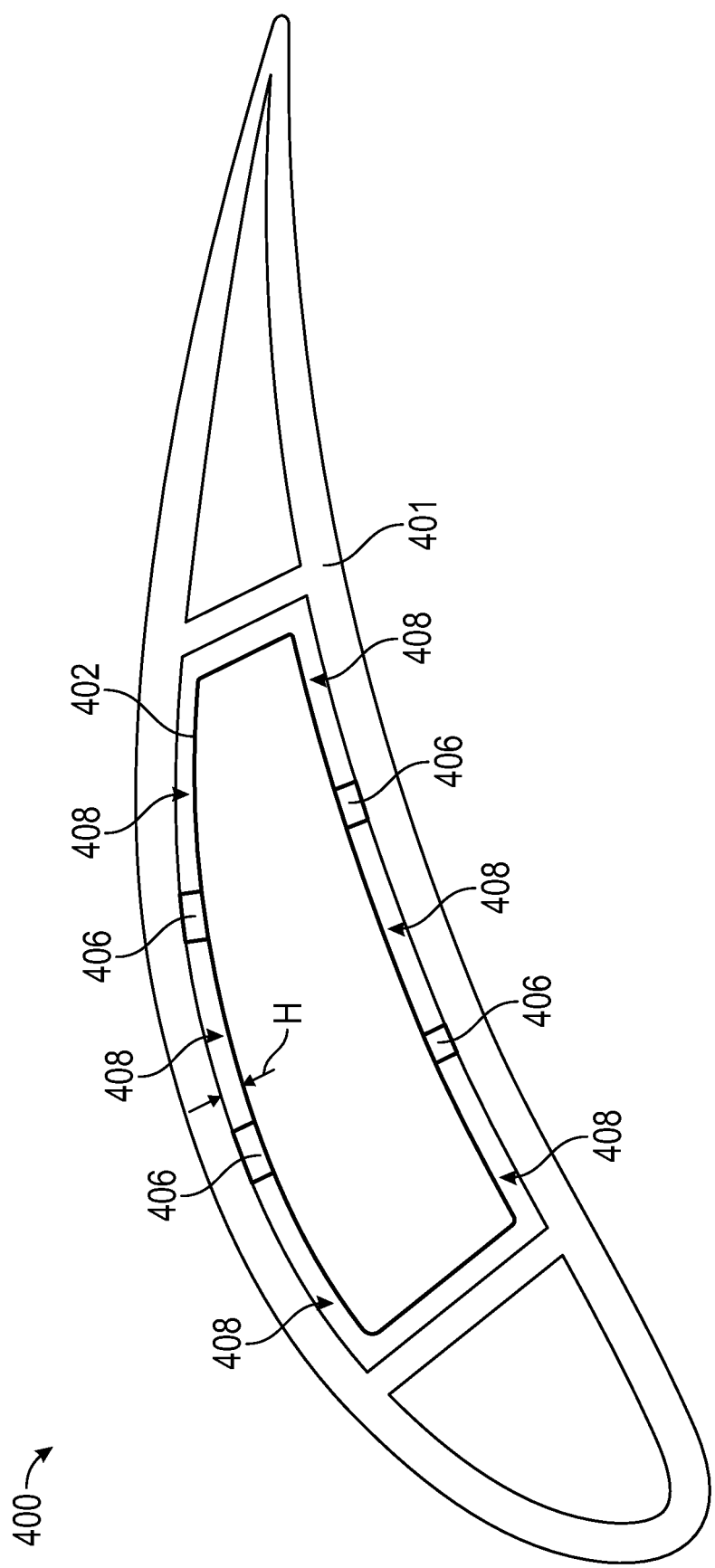
FIG. 4B is a cross-sectional illustration of the airfoil assembly of FIG. 4A viewed along the line B-B of FIG. 4A.

Turning now to FIGS. 4A-4B, schematic illustrations of an airfoil assembly 400 formed from high-temperature-material materials is shown. FIG. 4A is a side elevation schematic view and FIG. 4B is a cross-sectional view along the line B-B shown in FIG. 4A.

The airfoil assembly 400 includes a metallic insert member 402 installed within a cavity of an airfoil body 401. The metallic insert member 402 may be formed from metal, such as sheet metal, nickel alloys, cobalt alloys, that may be manufactured using conventional investment casting processes, or directly fabricated from advanced additive manufacturing methods using laser power bed metal processes, such as direct metal laser sintering. The airfoil assembly 400 includes one or more internal cavities, such as shown and described above. In this embodiment, the metallic insert member 402 is located within a mid-body cavity, e.g., aft of a leading edge cavity and forward of a trailing edge cavity. The airfoil assembly 400, in this illustration, is a vane that extends from a platform 404. The metallic insert member 402 may be installed within the airfoil assembly 400 and may be attached to or otherwise connected to the platform 404 (or may be separate therefrom). For example, in a spar-type configuration, the metallic insert member 402 may be integrally formed with the platform 404. In a baffle-type configuration, the metallic insert member 402 may be separate from the platform 404 (or may be separately attached to the platform 404).

As previously discussed, because the airfoil body 401 is formed from high-temperature-material materials, the manufacturing methods used are not conducive to fabricating intricate discrete integrated heat transfer cooling features (e.g., trip strips, chevron trip strips, turbulators, pedestals, pin fins, hemispherical protrusions, etc.). To provide cooling and heat transfer augmentation, the metallic insert member 402 is arranged with convective heat transfer augmentation features along an exterior surface thereof. That is, the surface of the metallic insert member 402 that is adjacent to an interior surface of a hot exterior wall of the airfoil assembly 400 includes one or more heat transfer augmentation features to enable improved cooling of the high-temperature-material material airfoil assembly 400.

For example, as shown in FIG. 4A, the metallic insert member 402 includes one or more radially extending ribs 406. The radially extending ribs 406 extend in a flow direction when in use and extend along a length of the metallic insert member 402. The radially extending ribs 406 define one or more radially extending passages 408 between adjacent radially extending ribs 406. When installed within the airfoil assembly 400, the radially extending ribs 406 are arranged to extend from the metallic insert member 402 and toward the interior surface of the hot walls of the airfoil assembly 400. As such, the radially extending passages 408 are defined between an exterior surface of the metallic insert member 402 and interior surface of the airfoil assembly 400 (in a direction from pressure side to suction side) and between adjacent radially extending ribs 406 in an axial direction (in a direction from leading edge to trailing edge). In some embodiments, in addition to defining the radially extending passages 408, the radially extending ribs 406 may be provided and arranged as retention features to position the metallic insert member 402 within and relative to the body or walls of the airfoil body 401.

The radially extending passages 408 may be arranged to channel a cooling flow therethrough and along the material of the airfoil assembly 400. Cooling flow may be directed into the radially extending passages 408 from one or more feed slots 410 at an end of the metallic insert member 402 (e.g., at a location proximate the platform 404). The feed slot 410 shown in FIG. 4A may receive a cooling air from a platform inlet 412. The platform inlet 412 is arranged to receive cooling air from another location within a gas turbine engine, when the airfoil assembly 400 is installed therein and during user thereof. In one non-limiting example, a cooling flow may enter into the interior of the metallic insert member 402, flow through the feed slot 410 and into the radially extending passages 408 and flow in a radial direction along the interior of the hot walls of the airfoil assembly 400 to provide cooling thereto.

As shown, the metallic insert member 402 may further include one or more heat transfer augmentation features 414 on the exterior surface thereof. The heat transfer augmentation features 414 may be trip strips, chevron trip strips, pedestals, hemispherical protrusions, pin fins, and/or other heat transfer augmentation features as known in the art. The heat transfer augmentation features 414 may be arranged and configured to direct or encourage a flow through the radially extending passages 408 to anticipated hot spots or locations, to ensure adequate fill within the cavity, and to ensure a desired cooling scheme. As shown, the heat transfer augmentation features 414 may be arranged as single arrangement 414a or a double arrangement 414b, and such arrangements may be based, in part, upon the size of the heat transfer augmentation features 414 and upon the axial width of a given radially extending passage 408.

As shown, the radially extending passages 408 may be converging or narrowing in a flow direction (in this illustration converging from the outer diameter toward the inner diameter; or in a radially inward direction). The converging or narrowing radially extending passages 408 are formed by converging radially extending ribs 406. That is, an axial direction separation distance between two adjacent radially extending ribs 406 may decrease in a flow direction, and in this case in a radially inward direction. Where the radially extending ribs 406 are sufficiently far apart, the double arrangements 414b of the heat transfer augmentation features 414 are provided. However, as the radially extending passages 408 narrow, the heat transfer augmentation features 414 transition to the single arrangements 414a.

Although illustratively shown as continuous features, the radially extending ribs of some embodiments of the present disclosure, may be discontinuous, perforated, and/or segmented along the streamwise (radial) direction (referred to herein as "rib discontinuities"). The frequency and size of the rib discontinuities may be uniformly spaced or unevenly spaced depending on local internal cooling flow and convective heat transfer requirements required to mitigate non-uniformities in both radial and axial gas temperature and external heat flux distributions. The rib discontinuities in the radially extending ribs can allow for the cooling airflow flow within the skin core cooling passages that are formed between the metallic insert member and the internal surface of the hot high-temperature-material exterior airfoil wall to be redistributed between each of the radial cooling flow passages. In this sense, the internal cooling flow rate, Reynolds number, Mach number, pressure loss, internal convective heat transfer, and cooling air heat pickup may be able to be locally tailored and optimized. Such optimization and tailoring may be employed to mitigate and manage locally high external heat flux, reduce local airfoil through-wall temperature gradients and reduce local absolute external operating temperatures that may decrease local durability capability of the high-temperature-materials from which the airfoil and inner and out diameter end walls are fabricated.

When the metallic insert member 402 is installed within the airfoil body 401, the radially extending ribs 406 may contact the interior surface of the airfoil body 401, as shown in FIG. 4B. That is, the radially extending ribs 406 extend a height H in a direction from the exterior surface of the metallic insert member 402 and the interior surface of the airfoil body 401. The height H of the radially extending ribs 406, in some embodiments, may be uniform from one end to the other. In other embodiments, the height H of the radially extending ribs 406 may be changing, which may depend on the structure of the airfoil body 401, or be tailored based on other considerations. For example, in some embodiments, the height H of a given radially extending rib 406 may be non-constant, with shorter sections to allow fluid connection between adjacent radially extending passages 408 (e.g., allowing for a gap or non-contact between the radially extending rib 406 and the interior surface of the airfoil body 401).

That is, in some embodiments, the height, H, of the radial extending ribs 406 may also be varied in the streamwise direction to optimize local skin cooling passage flow area and cavity aspect ratio. In this sense the local internal convective heat transfer and pressure loss characteristics may also be tailored to reduce both local out-of-plane and through-wall temperature gradients. Thermal stress and strains induced by changes in the local external heat flux or differences in local transient response rates of the high-temperature-materials resulting from disproportionate geometric features may also be mitigated by tailoring the local thermal cooling effectiveness, in order to increase the thermal mechanical fatigue capability of the airfoil.

Figure 5:
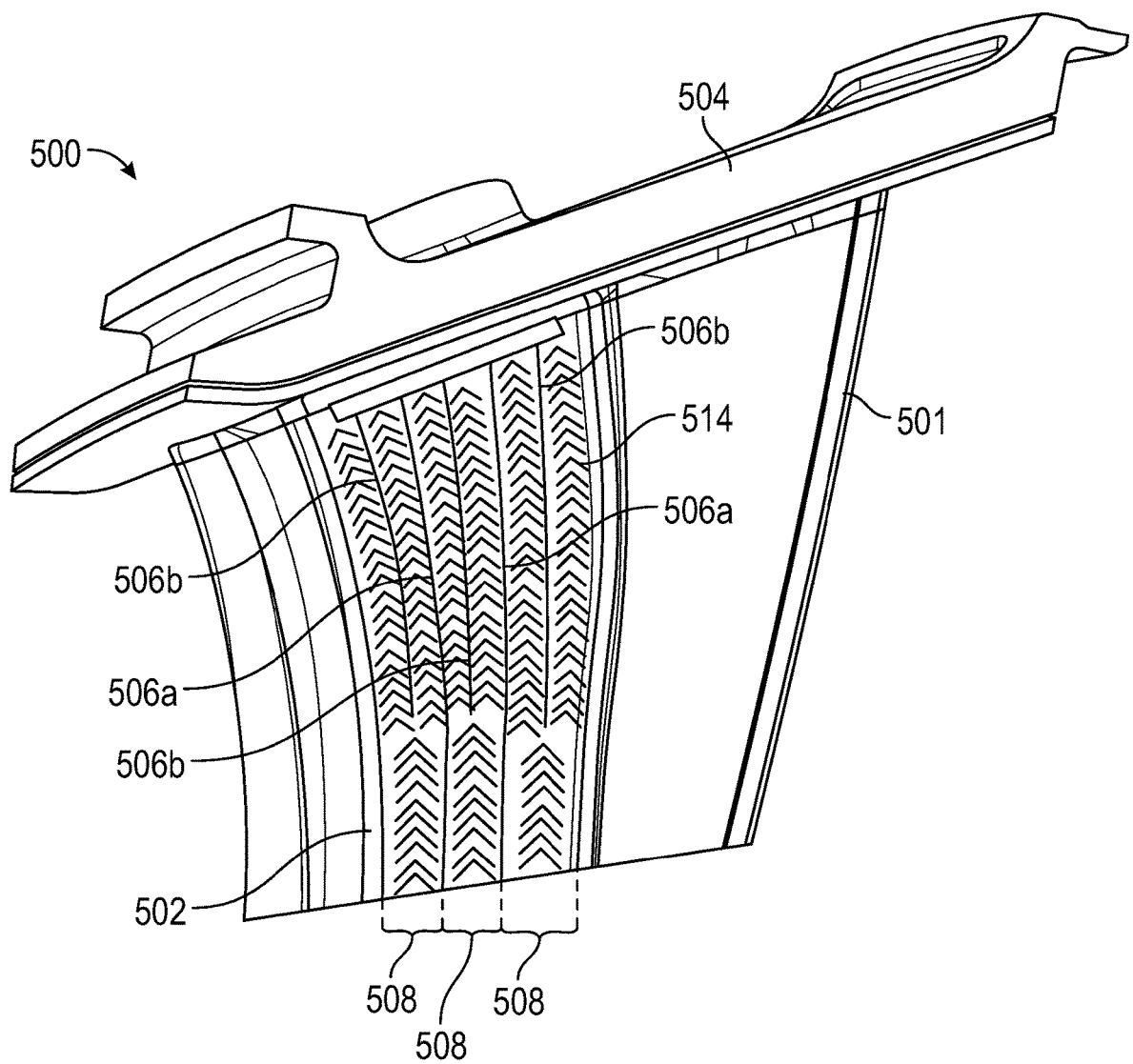
FIG. 5 is a schematic illustration of an airfoil and metallic insert member in accordance with an embodiment of the present disclosure.

Turning now to FIG. 5, a schematic illustration of an airfoil assembly 500 formed from high-temperature-material materials is shown. The airfoil assembly 500 includes a metallic insert member 502 installed within a cavity of an airfoil body 501 of the airfoil assembly 500. The airfoil assembly 500 includes one or more internal cavities, such as shown and described above. In this embodiment, the metallic insert member 502 is located within a mid-body cavity, e.g., aft of a leading edge cavity and forward of a trailing edge cavity. The airfoil body 501, in this illustration, defines a vane that extends from a platform 504. The metallic insert member 502 may be installed within the airfoil assembly 500 and may be attached to or otherwise connected to the platform 504 (or may be separate therefrom).

Similar to that described above, the metallic insert member 502 includes one or more radially extending ribs 506a, 506b. The radially extending ribs 506a, 506b extend in a flow direction when in use and extend along a length of the metallic insert member 502. The radially extending ribs 506a, 506b define one or more radially extending passages 508 between adjacent radially extending ribs 506a, 506b. When installed within the airfoil assembly 500, the radially extending ribs 506a, 506b are arranged to extend from the metallic insert member 502 and toward the interior surface of the hot walls of the airfoil assembly 500. As such, the radially extending passages 508 are defined between an exterior surface of the metallic insert member 502 and interior surface of the airfoil assembly 500 (in a direction from pressure side to suction side) and between adjacent radially extending ribs 506a, 506b in an axial direction (in a direction from leading edge to trailing edge). In some embodiments, in addition to defining the radially extending passages 508, one or more of the radially extending ribs 506a, 506b may be provided and arranged as retention features to position the metallic insert member 502 within and relative to the body or walls of the airfoil body 501.

In this embodiment, two types of radially extending ribs 506a, 506b are provided. Full-length radially extending ribs 506a may extend a full radial length of the metallic insert member 502 (e.g., from an outer diameter to an inner diameter when installed within the airfoil assembly 500). Partial-length radially extending ribs 506b may extend a partial radial length of the metallic insert member 502 (e.g., from an outer diameter toward an inner diameter when installed within the airfoil assembly 500, but not extending the full radial length of the metallic insert member 502). This provides for partial extent radially extending passages 508 defined between the partial-length radially extending ribs 506b where the radially extending passages 508 may have too large of an axial separation distance between the Full-length radially extending ribs 506a. Such configuration allows for each radially extending passage 508 to have single arrangements of heat transfer augmentation features 514 therein.

Figure 6:
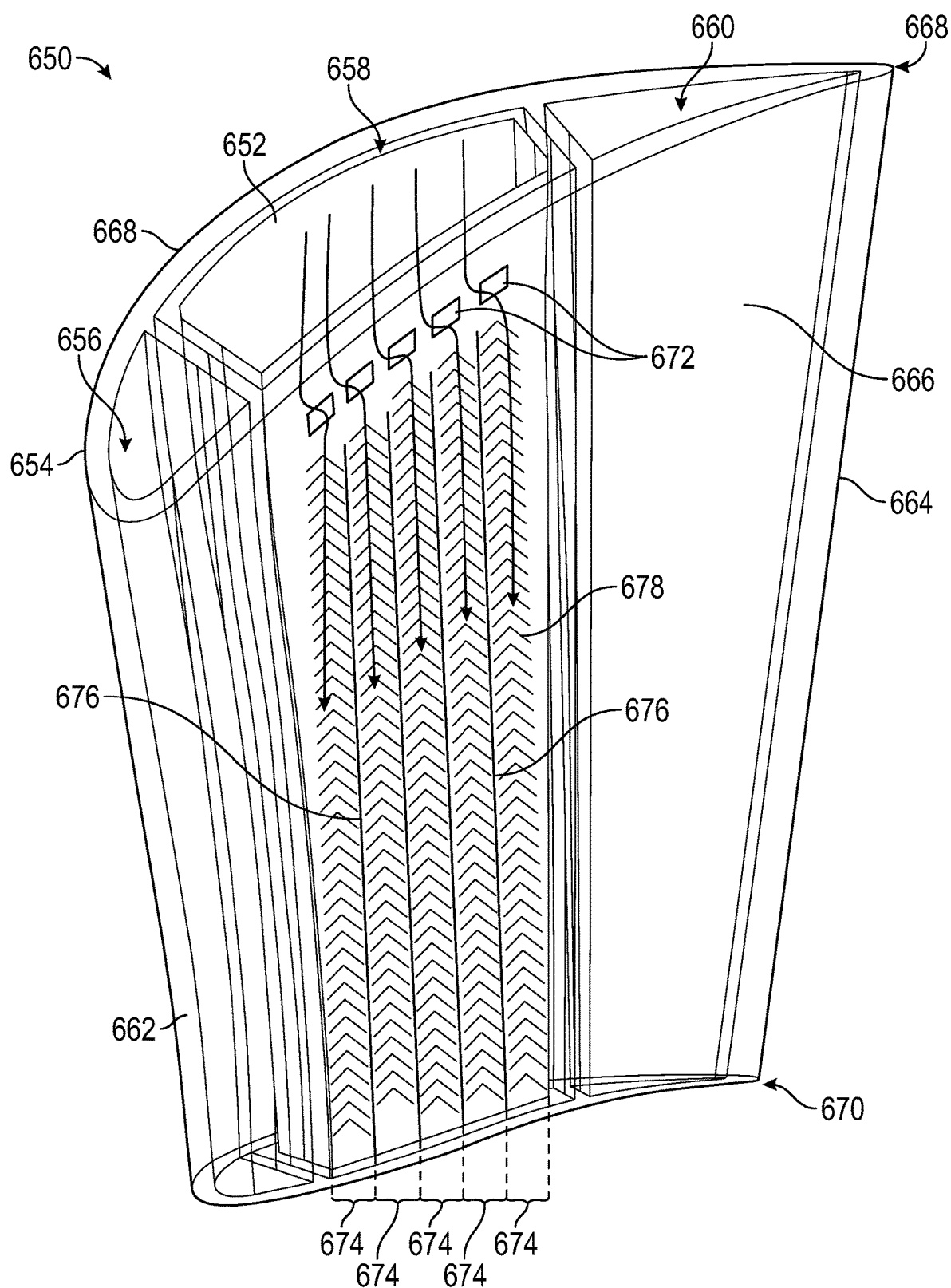
FIG. 6 is a schematic illustration of an airfoil and metallic insert member in accordance with an embodiment of the present disclosure.

Turning now to FIG. 6, a schematic illustration of an airfoil 650 formed from high-temperature-material materials is shown. The airfoil 650 includes a metallic insert member 652 installed within a cavity of an airfoil body 654 of the airfoil 650. The airfoil 650 includes one or more internal cavities 656, 658, 660. As shown, the airfoil 650 includes a leading edge cavity 656 arranged along a leading edge 662 of the airfoil body 654. Aft of the leading edge cavity 656 is a mid-body cavity 658, and aft of the mid-body cavity 658 is a trailing edge cavity 660 arranged along a trailing edge 664 of the airfoil body 654. The airfoil body 654 further defines a pressure side 666 and a suction side 668.

In this embodiment, the metallic insert member 652 is located within the mid-body cavity 658. In this embodiment, no platform is shown, but the airfoil body 654 may be configured to be attached to a platform at a first (e.g., outer) end 668 and/or a second (e.g., inner) end 670 (in a radial direction). The metallic insert member 652 may be installed within the airfoil 650 and may be attached to or otherwise connected to a platform as described above.

Similar to the embodiments described above, the metallic insert member 652 includes one or more feed slots 672 at an end of the metallic insert member 652. The feed slots 672 are arranged to supply cooling air into one or more radially extending passages 674. The radially extending passages 674 are separated and defined by radially extending ribs 676 and may include heat transfer augmentation features 678 therein.

The radially extending passages may be considered "skin core passages" having a hot side exposed to hot gas path air (e.g., a side defined by a portion of the airfoil body) and a cold side that is exposed to internal cooling air within the metallic insert member. The skin core passages defined between the radially extending ribs, the exterior surface of the metallic insert member, and the interior surface of the airfoil body may have aspect ratios with small height between the metallic insert member and hot wall and larger axial dimension.

In some embodiments, the radially extending ribs may be arranged partially or fully extending along the metallic insert member such that the formed or defined radially extending passages are maintained with a desired aspect ratio that flows in the radial direction. Further, in a direction from pressure side to suction side (i.e., a height), the radially extending ribs may extend one quarter of the distance to the interior of the airfoil body from the surface of the inner structure or greater (i.e., up to a full distance and thus contact the interior surface of the airfoil body). In the case of partially extending radial ribs, alternate locator pins may be utilized. In some arrangements, some of the radially extending ribs may be full-height ribs that extend from the metallic insert member and into contact with the interior surface of the airfoil body while other of the radially extending ribs may be less than full-height. The full-height radially extending ribs may provide structural support and positioning of the metallic insert member within the airfoil while the less than full-height radially extending ribs may be arranged to enable a desired cooling flow and scheme along a hot wall of the airfoil.

Although shown with feed slots on the metallic insert members, such feed slots may not be required in all embodiments. For example, in some embodiments, the cooling air may be directed directly into the radially extending passages. In some such embodiments, the metallic insert member may have a solid top, rather than being open, as shown in the illustrations. That is, the top of the metallic insert member where the cooling flow is received may be solid to direct the cooling flow toward the sides and the radially extending passages.

Further, although shown with the described metallic insert members located in mid-body cavities, such configurations are not to be limiting. For example, metallic insert members as described herein may be installed within leading edge cavities and/or trailing edge cavities. However, such illustrations are not shown due to detail and ease of illustration.

In some embodiments, the radially extending ribs may be linear, curvilinear, include multiple inflections, and/or include or be formed of oscillating curves of constant or varying radii along the exterior surface of the metallic insert members of the present disclosure. In this sense, the local cooling passage flow areas and local cavity aspect ratios may be optimized to improve local convective heat transfer flow and cooling characteristics. Additionally, if local film cooling is required to mitigate locally high external surface temperatures and/or exterior airfoil through-wall temperature gradients, the internal pressures within each of the radial flow cooling passages may be tailored using the mechanisms described above. That is, the various alternative configurations/mechanisms may be employed to ensure positive pressure ratio and local film cooling hole aperture backflow margin to be maintained throughout mission flight points, in order to mitigate the likelihood of potential hot gas entrainment.

Figure 7:
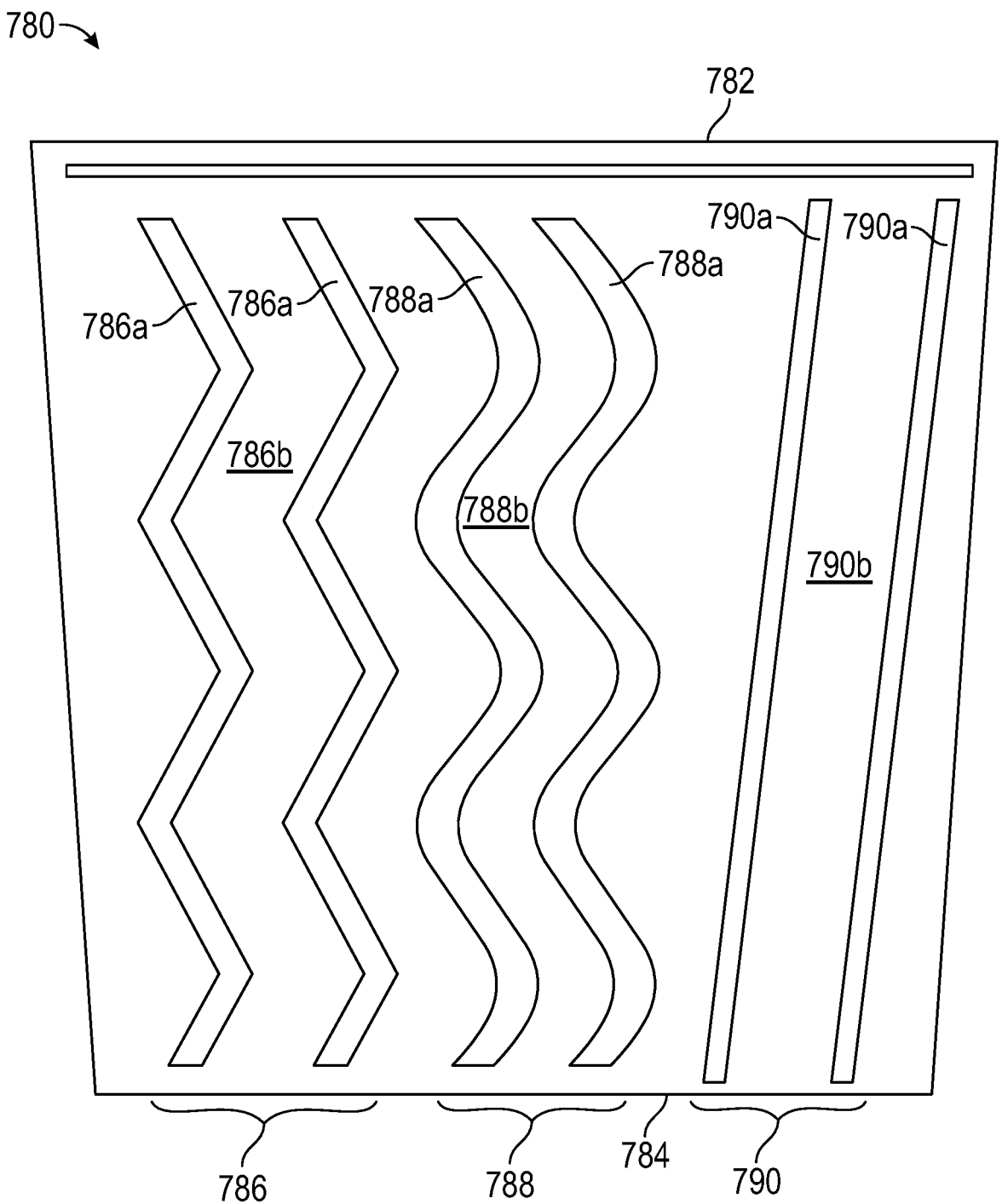
FIG. 7 is a schematic illustration of a portion of a metallic insert member illustrating different radially extending ribs in accordance with some embodiments of the present disclosure.

For example, turning to FIG. 7, a schematic illustration of an exterior surface of a metallic insert member 780 in accordance with an embodiment of the present disclosure is shown. The metallic insert member 780 extends in a radial direction from a first end 782 (e.g., outer diameter) to a second end 784 (e.g., inner diameter). The metallic insert member 780 includes a number of different structure radially extending ribs that can be formed to provide support structure and define radially extending passages for cooling an airfoil body (e.g., a high-temperature-material airfoil body).

As shown a first set 786 of radially extending ribs 786a are non-linear and include inflection points that change the angle of the radially extending ribs 786a. A radially extending passage 786b is defined between the radially extending ribs 786a. A second set 788 of radially extending ribs 788a are non-linear and include a curvature or curve that changes the angle of the radially extending ribs 788a, but in a relatively smooth fashion, as compared to the first set 786 of radially extending ribs 786a. A radially extending passage 788b is defined between the radially extending ribs 788a. A third set 790 of radially extending ribs 790a are substantially linear but are not directly perpendicular to the first or second ends 782, 784, but rather are angled or offset from a purely radial direction. A radially extending passage 790b is defined between the radially extending ribs 790a. The illustrative geometries shown in FIG. 7 are merely for example, and those of skill in the art will appreciate that other geometries or structures may be employed for the radially extending ribs. Further, this illustration illustrates changes along the radial extent of the radially extending ribs, but a height (i.e., into and out of the page of FIG. 7) may also be variable at various locations along the radial extent or in a gradual manner (e.g., gradually increasing or decreasing in height from the first end 782 toward the second end 784). Additionally, different geometries and/or continuous/discontinuous radially extending ribs may be used at different axial locations along the metallic insert member to achieve desired cooling and heat transfer.

Figure 8:
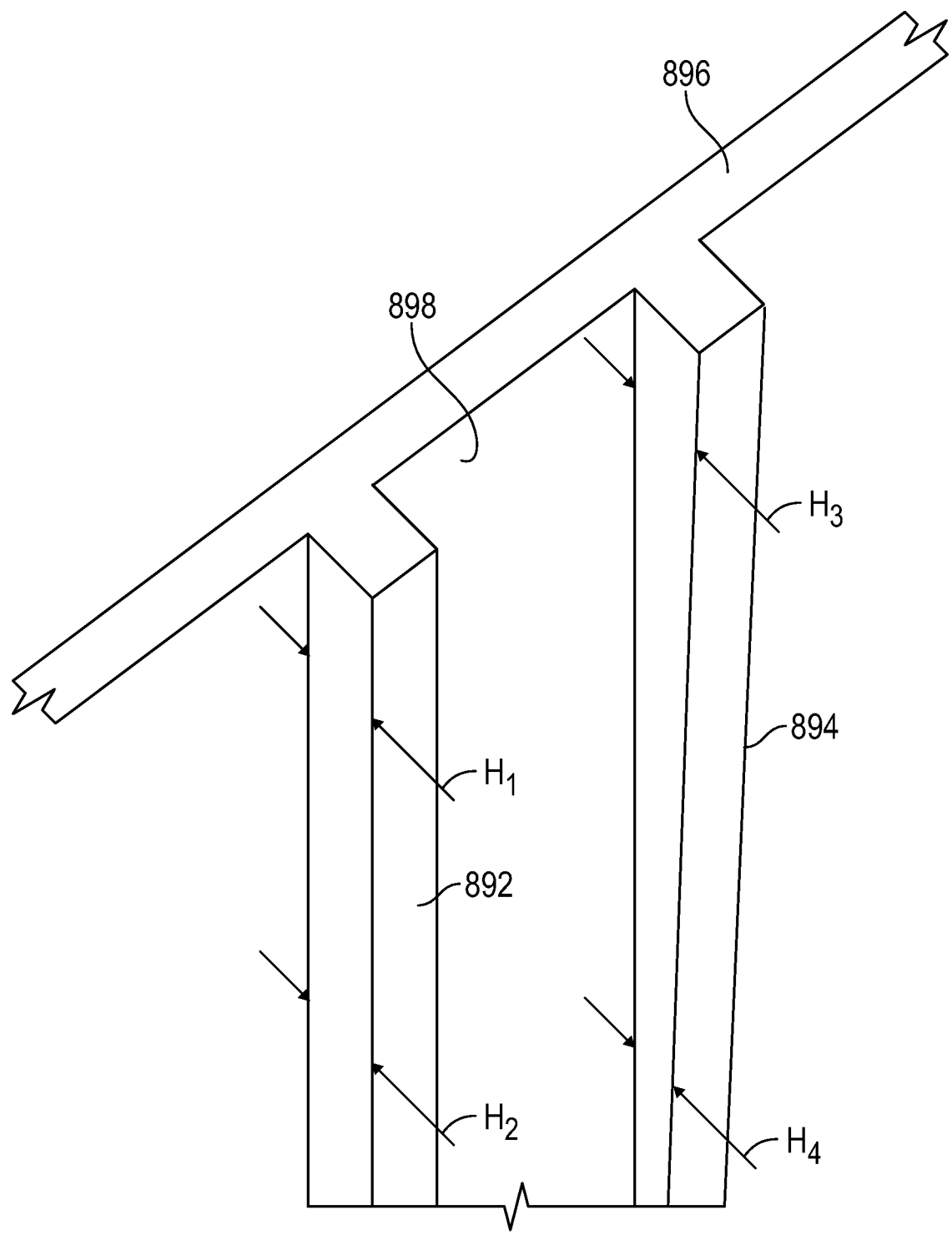
FIG. 8 is a schematic illustration of radially extending ribs of metallic insert members in accordance with an embodiment of the present disclosure.

Turning now to FIG. 8, a schematic illustration of the height of radially extending ribs 892, 894 of a metallic insert member 896 is shown. The first radially extending rib 892 has a constant height along the radial extend thereof. That is, at a first radial location the first radially extending rib 892 has a first height $H_1$ and at a different radial location of the first radially extending rib 892 has a second height $H_2$. In this configuration of constant height, the first height $H_1$ equals the second height $H_2$ at all radial locations along the first radially extending rib 892. In contrast, the second radially extending rib 894 has non-constant height along the radial extent thereof. That is, a first height $H_3$ of the second radially extending rib 894 at a first radial location is greater than a second height $H_4$ of the second radially extending rib 894 at a second radial location. In this specific example, the height of the second radially extending rib 894 shortens as the second radially extending rib 894 extends radially inward. In other configurations, the change in height may increase as it extends radially inward. Further, in some embodiments, the height may be step changed or curved for a continuously changing rib height. Those of skill in the art will appreciate that variations in height are possible without departing from the scope of the present disclosure.

Although the various above embodiments are shown as separate illustrations, those of skill in the art will appreciate that the various cooling design features can be combined, mixed, and matched in order to produce an airfoil cooling design configuration having the desired functional thermal cooling performance that is enabled by one or more features described herein. Thus, the above described embodiments are not intended to be distinct arrangements and structures of airfoils, but rather are provided as separate embodiments for clarity and ease of explanation.

Advantageously, embodiments described herein provide for cooling configurations that allow for flow reduction in passages bounded by radially extending ribs. Such configuration can eliminate the need for purging cooling holes to enable other cooling configurations such as direct impingement. Further, advantageously, because the radially extending ribs are formed with the construction of the metallic insert member, the aspect ratio of radially extending passages can be tailored to specific heat transfer requirements through the adjustment in radial flow area defined therebetween. Further control of cooling schemes may be provided through the placement of the radially extending ribs and/or the merging of various radially extending ribs. Moreover, by incorporating the metallic insert members described herein into the cooling schemes for airfoils, embodiments described herein enable the creation of highly constricted skin core passages to increase fluid velocity and total internal heat transfer. Furthermore, advantageously, embodiments described herein enable the use of high temperature materials for the formation of airfoils (such as CMCs, monolithic ceramics, refractory metal alloys) without requiring such high-temperature-material material to include heat transfer augmentation features as was typically done with metal-based airfoil bodies.

As used herein, the term "about" is intended to include the degree of error associated with measurement of the particular quantity based upon the equipment available at the time of filing the application. For example, "about" may include a range of ±8%, or 5%, or 2% of a given value or other percentage change as will be appreciated by those of skill in the art for the particular measurement and/or dimensions referred to herein.

The terminology used herein is for the purpose of describing particular embodiments only and is not intended to be limiting of the present disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof. It should be appreciated that relative positional terms such as "forward," "aft," "upper," "lower," "above," "below," "radial," "axial," "circumferential," and the like are with reference to normal operational attitude and should not be considered otherwise limiting.

While the present disclosure has been described with reference to an illustrative embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. An airfoil assembly for a gas turbine engine, the airfoil assembly comprising:
   an airfoil body having a leading edge, a trailing edge, a pressure side, and a suction side, the airfoil body extending in a radial direction between a first end and a second end, wherein the airfoil defines an internal cavity bounded by interior surfaces of the airfoil body, the airfoil body formed from a high-temperature-material material;
   a metallic insert member installed within the internal cavity;
   one or more radially extending ribs arranged on an exterior surface of the metallic insert member and defining one or more radially extending passages between the exterior surface of the metallic insert member and the interior surface of the airfoil body; and
   one or more feed slots at an end of the metallic insert member and arranged to allow a flow of air from an interior of the metallic insert member into the one or more radially extending passages.

2. The airfoil assembly of claim 1, wherein at least one of the one or more radially extending ribs extends a full height from the exterior surface of the metallic insert member to the interior surface of the airfoil body and contacts the interior surface of the airfoil body.

3. The airfoil assembly of claim 1, further comprising one or more heat transfer augmentations features on the exterior surface of the metallic insert member and arranged within one of the one or more radially extending passages.

4. The airfoil assembly of claim 3, wherein the one or more heat transfer augmentations features are arranged in at least one of a single arrangement and a double arrangement along the exterior surface of the metallic insert member within one of the one or more radially extending passages.

5. The airfoil assembly of claim 1, further comprising a platform, wherein the airfoil body extends from the platform.

6. The airfoil assembly of claim 1, wherein the internal cavity of the airfoil body is a mid-body cavity defined within the airfoil body.

7. The airfoil assembly of claim 6, wherein the airfoil body defines a plurality of additional internal cavities including at least a leading edge cavity and a trailing edge cavity.

8. The airfoil assembly of claim 1, wherein the high-temperature-material material of the airfoil body is a ceramic matrix composite.

9. The airfoil assembly of claim 1, wherein the high-temperature-material material of the airfoil body is a refractory metal alloy.

10. An airfoil assembly for a gas turbine engine, the airfoil assembly comprising:
    an airfoil body having a leading edge, a trailing edge, a pressure side, and a suction side, the airfoil body extending in a radial direction between a first end and a second end, wherein the airfoil defines an internal cavity bounded by interior surfaces of the airfoil body, the airfoil body formed from a high-temperature-material material;
    a metallic insert member installed within the internal cavity; and
    one or more radially extending ribs arranged on an exterior surface of the metallic insert member and defining one or more radially extending passages between the exterior surface of the metallic insert member and the interior surface of the airfoil body,
    wherein the one or more radially extending ribs includes at least one full-length radially extending rib and at least one partial-length radially extending rib.

11. The airfoil assembly of claim 10, wherein at least one of the one or more radially extending ribs extends a full height from the exterior surface of the metallic insert member to the interior surface of the airfoil body and contacts the interior surface of the airfoil body.

12. The airfoil assembly of claim 10, further comprising one or more heat transfer augmentations features on the exterior surface of the metallic insert member and arranged within one of the one or more radially extending passages.

13. The airfoil assembly of claim 10, further comprising a platform, wherein the airfoil body extends from the platform.

14. The airfoil assembly of claim 10, wherein the internal cavity of the airfoil body is a mid-body cavity defined within the airfoil body.

15. The airfoil assembly of claim 10, wherein the high-temperature-material material of the airfoil body is one of a ceramic matrix composite and a refractory metal alloy.

16. An airfoil assembly for a gas turbine engine, the airfoil assembly comprising:
    an airfoil body having a leading edge, a trailing edge, a pressure side, and a suction side, the airfoil body extending in a radial direction between a first end and a second end, wherein the airfoil defines an internal cavity bounded by interior surfaces of the airfoil body, the airfoil body formed from a high-temperature-material material;
    a metallic insert member installed within the internal cavity; and
    one or more radially extending ribs arranged on an exterior surface of the metallic insert member and defining one or more radially extending passages between the exterior surface of the metallic insert member and the interior surface of the airfoil body,
    wherein the one or more radially extending ribs are at least one of non-linear and non-uniform in the radial direction.

17. The airfoil assembly of claim 16, wherein at least one of the one or more radially extending ribs extends a full height from the exterior surface of the metallic insert member to the interior surface of the airfoil body and contacts the interior surface of the airfoil body.

18. The airfoil assembly of claim 16, further comprising one or more heat transfer augmentations features on the exterior surface of the metallic insert member and arranged within one of the one or more radially extending passages.

19. The airfoil assembly of claim 16, further comprising a platform, wherein the airfoil body extends from the platform.

20. The airfoil assembly of claim 16, wherein the internal cavity of the airfoil body is a mid-body cavity defined within the airfoil body.

* * * * *